United States Patent
Strong

(10) Patent No.: US 9,568,100 B2
(45) Date of Patent: Feb. 14, 2017

(54) TRANSMISSION PISTON WITH RETAINED RELEASE SPRING

(71) Applicant: SCHAEFFLER TECHNOLOGIES AG & CO. KG, Herzogenaurach (DE)

(72) Inventor: Scott Strong, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 707 days.

(21) Appl. No.: 13/848,079

(22) Filed: Mar. 21, 2013

(65) Prior Publication Data

US 2013/0284017 A1   Oct. 31, 2013

Related U.S. Application Data

(60) Provisional application No. 61/638,878, filed on Apr. 26, 2012.

(51) Int. Cl.
  *F16D 25/08*  (2006.01)
  *F16J 15/00*  (2006.01)
  *F16D 13/58*  (2006.01)

(52) U.S. Cl.
  CPC ............. *F16J 15/00* (2013.01); *F16D 25/087* (2013.01); *F16D 13/583* (2013.01); *F16D 13/585* (2013.01); *F16D 2300/08* (2013.01); *Y10T 29/49249* (2015.01)

(58) Field of Classification Search
  CPC .... F16D 25/087; F16D 25/12; F16D 2300/08; F16D 13/583; F16D 13/585
  See application file for complete search history.

(56) References Cited

U.S. PATENT DOCUMENTS

| 2,818,708 | A | * | 1/1958 | Kelley ........................... 60/337 |
| 3,237,739 | A | * | 3/1966 | Pritchard ............. F16D 13/583 |
| | | | | 192/89.25 |
| 4,623,055 | A | * | 11/1986 | Ohkubo ..................... 192/85.34 |
| 5,232,411 | A | | 8/1993 | Hayashi et al. |

(Continued)

FOREIGN PATENT DOCUMENTS

EP   0422767 B1   3/1995
EP   0812998 A1   12/1997

OTHER PUBLICATIONS

International Search Report for PCT/US2013/033397, mailed Jul. 18, 2013 by the Korean Intellectual Property Office.

*Primary Examiner* — Michael Leslie
*Assistant Examiner* — Michael Quandt
(74) *Attorney, Agent, or Firm* — Kevin L. Parks

(57) ABSTRACT

A piston assembly for a transmission includes a piston housing and a release spring. The piston housing has a bore including a first radial wall and a circumferential wall. The release spring has a first radially outwardly extending finger portion, a second radially outwardly extending finger portion, and a conical portion. The first finger portion is for pressing engagement with the first radial wall and the second finger portion is for pressing engagement with the circumferential wall. The conical portion is disposed radially inward of the first and second finger portions. In an example embodiment, the piston housing includes a second radial wall for pressing against a clutch pack for the transmission. In some example embodiments, the piston assembly includes a seal plate, fixed to the piston housing and arranged to retain at least one piston seal.

8 Claims, 6 Drawing Sheets

(56) References Cited

U.S. PATENT DOCUMENTS

| | | | |
|---|---|---|---|
| 5,307,730 A * | 5/1994 | Erwin | F16D 25/12 188/71.8 |
| 5,857,666 A * | 1/1999 | Zhi-Peng et al. | 267/161 |
| 6,360,863 B1 | 3/2002 | Young | |
| 6,675,944 B2 | 1/2004 | Lee | |
| 6,892,869 B2 * | 5/2005 | Ookita et al. | 192/85.34 |
| 7,247,114 B2 | 7/2007 | Kaneda et al. | |
| 2010/0065399 A1 | 3/2010 | Obergasser | |
| 2011/0290612 A1 | 12/2011 | George | |

* cited by examiner

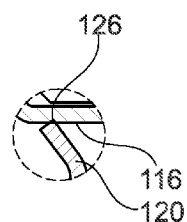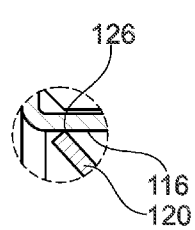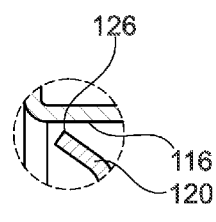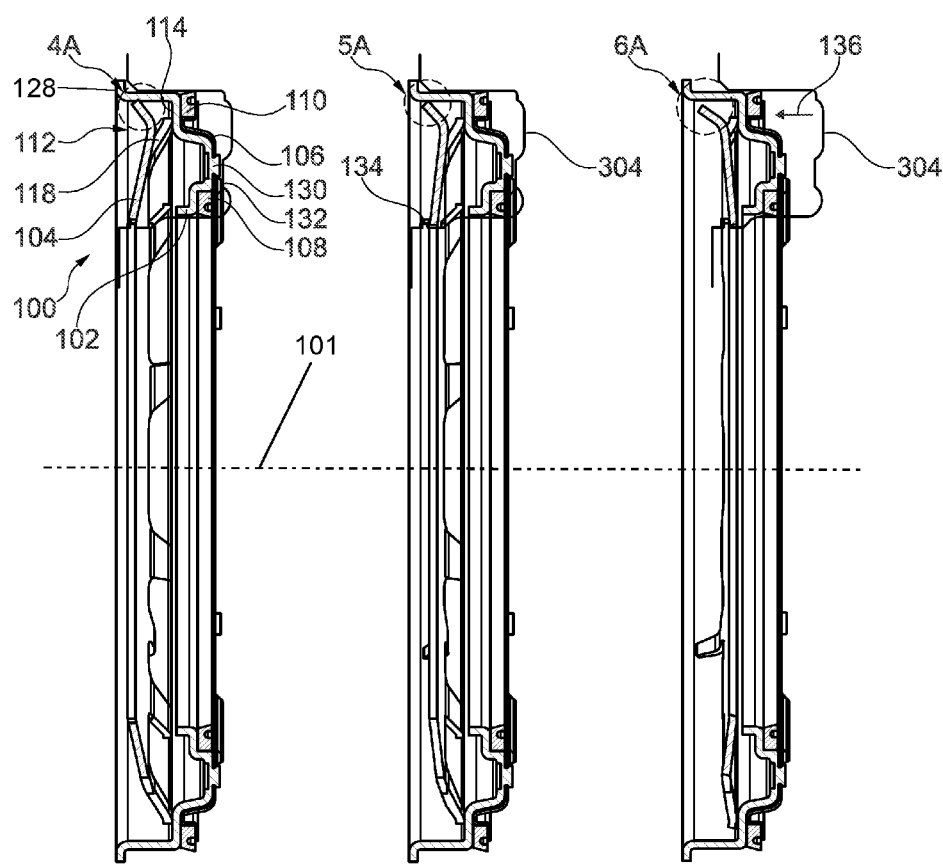

TRANSMISSION PISTON WITH RETAINED RELEASE SPRING

FIELD

The invention relates generally to a piston for a vehicle transmission, and more specifically to a transmission piston with a retained release spring.

BACKGROUND

Pistons and release springs for automatic transmissions are known. Examples are shown in U.S. Pat. No. 6,675,944 to Lee, U.S. Pat. No. 5,232,411 to Hayashi et al., and U.S. Pat. No. 7,247,114 to Kaneda et al.

BRIEF SUMMARY

Example aspects broadly comprise a piston assembly for a transmission including a piston housing and a release spring. The piston housing has a bore including a first radial wall and a circumferential wall. The release spring has a first radially outwardly extending finger portion, a second radially outwardly extending finger portion, and a conical portion. The first finger portion is for pressing engagement with the first radial wall and the second finger portion is for pressing engagement with the circumferential wall. The conical portion is disposed radially inward of the first and second finger portions. In an example embodiment, the piston housing includes a second radial wall for pressing against a clutch pack for the transmission. In some example embodiments, the piston assembly includes a seal plate, fixed to the piston housing and arranged to retain at least one piston seal.

In an example embodiment, the piston assembly includes first and second seals disposed axially between the piston housing and the seal plate. In an example embodiment, the seal plate is fixed to the piston housing by a rivet integral with and protruding from the piston housing. In an example embodiment, the release spring is arranged such that the second radially outwardly extending finger portion is radially displaced when the first radially outwardly extending finger is axially displaced.

Other example aspects broadly comprise a piston assembly for a transmission including a backing plate, a seal, a release spring, and a seal plate. The seal plate is fixed to the backing plate and axially retaining the seal and the release spring relative to the backing plate. In an example embodiment, the seal plate includes an outwardly-extending radial wall and a circumferential wall arranged to retain the seal. In an example embodiment, the seal plate includes an integrally-formed axially protruding portion and an integrally-formed inwardly-extending tab. The release spring is arranged to pivot on the protruding portion and includes a radially outwardly-extending finger portion extending radially beyond the seal plate tab. In an example embodiment, the seal plate is fixed to the backing plate by a rivet integral with and protruding from the backing plate.

Other example aspects broadly comprise a method of installing a piston into a transmission including pressing a release spring into a piston housing such that a first radially extending finger is displaced radially inwardly by a circumferential wall of the piston housing. In an example embodiment, the method includes axially displacing a second radially extending finger against the piston housing so that the first radially extending finger is displaced radially inwardly away from the housing, and installing a retainer to limit axial displacement of the second radially extending finger. In an example embodiment, the retainer is a snap ring. In an example embodiment, the method includes displacing the piston housing away from a transmission housing to further displace the first and second radially extending fingers and engage a clutch pack of the transmission.

BRIEF DESCRIPTION OF THE DRAWINGS

The nature and mode of operation of the present invention will now be more fully described in the following detailed description taken with the accompanying drawing figures, in which:

FIG. 4 is a section view of the transmission piston assembly of FIG. 2 taken generally along line 4-4 in FIG. 3 shown in a free state;

FIG. 4A is a detail view of encircled region 4A in FIG. 4;

FIG. 5 is a section view of the transmission piston assembly of FIG. 2 taken generally along line 4-4 in FIG. 3 shown installed in a transmission;

FIG. 5A is a detail view of encircled region 5A in FIG. 5;

FIG. 6 is a section view of the transmission piston assembly of FIG. 2 taken generally along line 4-4 in FIG. 3 shown in an axially displaced position;

FIG. 6A is a detail view of encircled region 6A in FIG. 6;

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
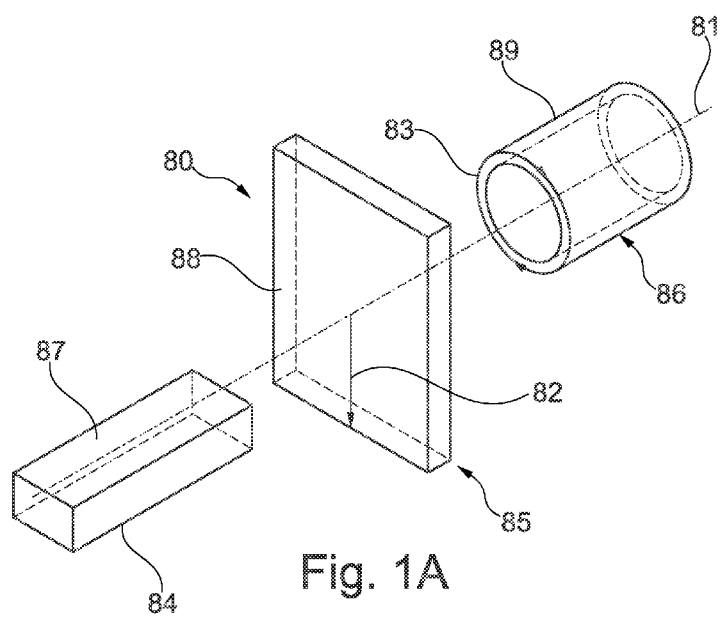
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow.

The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
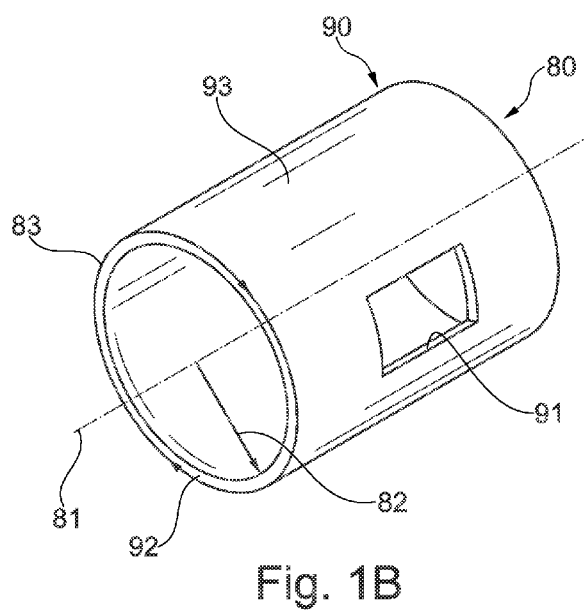
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
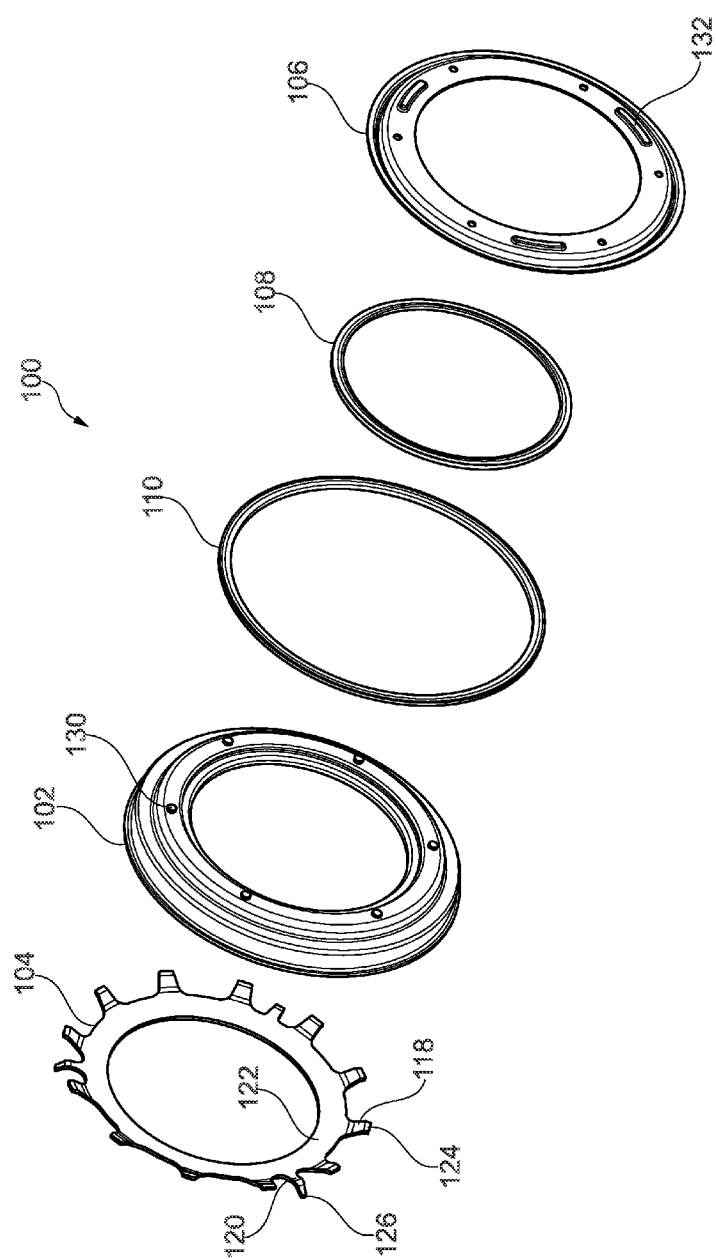
FIG. 2 is a an exploded view of a transmission piston assembly according to an example aspect.
Figure 3:
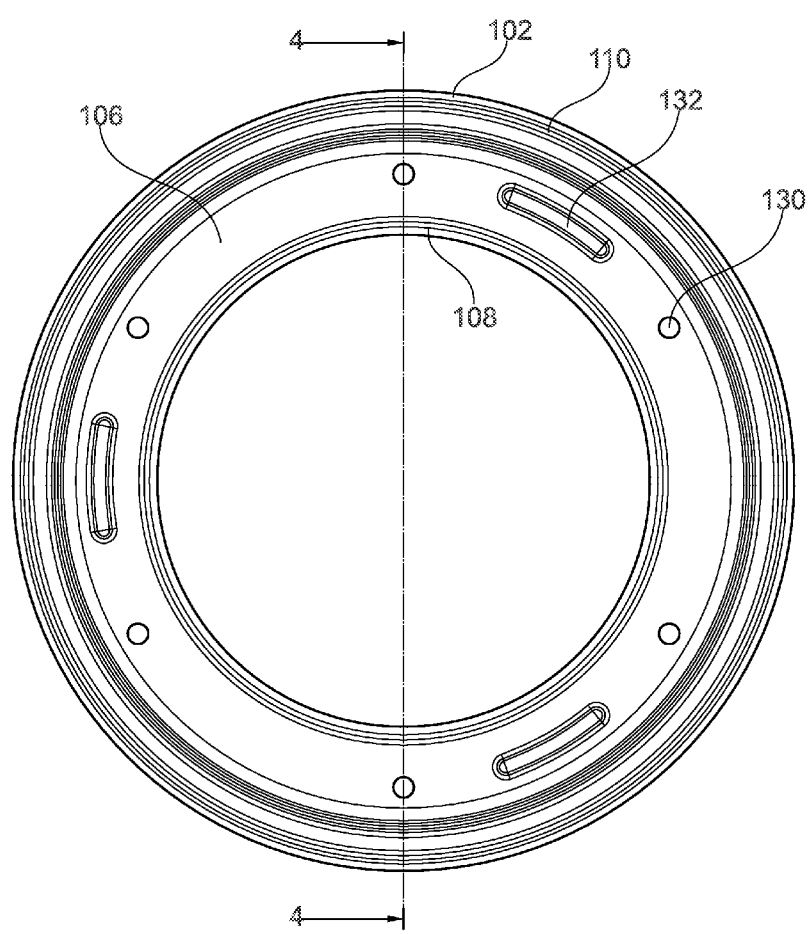
FIG. 3 is a back view of the transmission piston assembly of FIG. 2.

The following description is made with reference to FIGS. 2-4. FIG. 2 is an exploded view of transmission piston assembly 100 according to an example aspect. FIG. 3 is a back view of transmission piston assembly 100. FIG. 4 is a section view of transmission piston assembly 100 taken generally along line 4-4 in FIG. 3 shown in a free state. Piston assembly 100 includes axis 101, piston housing 102, release spring 104, seal plate 106, and seals 108 and 110. Seals 108 and 110 are arranged to seal the piston assembly to a transmission housing (not shown). Housing 102 includes bore 112. Bore 112 includes radial wall 114 and circumferential wall 116 extending about axis 101. Release spring 104 includes finger portions, or fingers, 118 and 120, and conical portion 122.

Portion 118 is a radially outwardly extending finger portion for pressing engagement with radial wall 114. That is, portion, or finger, 118 lies adjacent wall 114 and distal end 124 is pressed against the wall during operation of piston assembly 100 as described in more detail below. Portion 120 is a radially outwardly extending finger portion for pressing engagement with circumferential wall 116. That is, portion, or finger, 120 lies adjacent wall 116 and distal end, or tip, 126 is pressed against the wall during manufacture of piston assembly 100 as described in more detail below. Conical portion 122 is disposed radially inward of finger portions 118 and 120.

Piston housing 102 also includes radial wall 128 for pressing against a clutch pack for the transmission (not shown). That is, during operation of a vehicle, clutches may be actuated to change gears in the transmission. In a planetary automatic transmission, for example, the clutches are typically engaged by hydraulic pressure acting on clutch pistons. For clutch assembly 100, hydraulic pressure acting on the piston housing is transmitted to the clutch pack by radial wall 128. The pressure force displaces the piston assembly to press against the clutch pack, clamping the clutch plates and engaging the gear as is known in the art. The gear is disengaged by lowering the hydraulic pressure so that release spring 104 pushes the housing away from the clutch pack.

Seal plate 106 is fixed to piston housing 102. Plate 106 is arranged to retain seals 108 and 110. That is, the seals are axially retained between the seal plate and the piston housing. That is, seals 108 and 110 are disposed axially between the piston housing and the seal plate. Seal 108 is radially positioned by a recessed area in the piston housing. Seal 110 is radially positioned by a recessed area in the seal plate. In an example embodiment, plate 106 is fixed to housing 102 by rivet 130. Rivet 130 is integral with and protruding from the piston housing. Plate 106 includes axially protruding segments 132 for limiting axial travel of housing 102 towards to a transmission housing (not shown).

Figure 7:
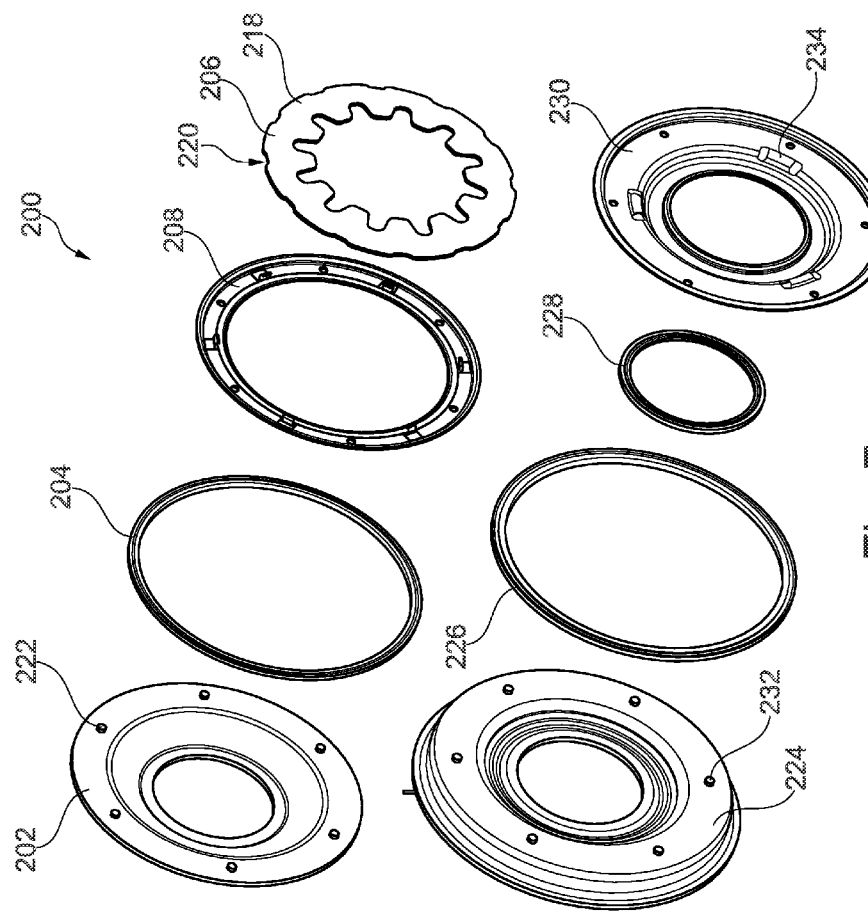
FIG. 7 is an exploded view of a transmission piston assembly according to an example aspect.
Figure 8:
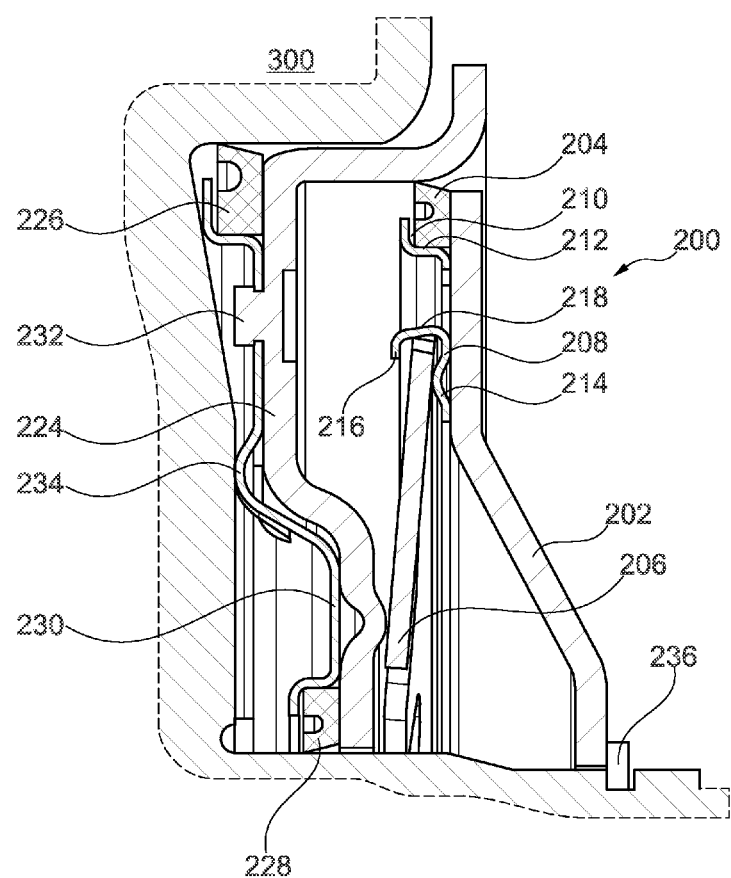
FIG. 8 is a section view of the transmission piston assembly of FIG. 7 shown installed in a transmission housing.

The following description is made with reference to FIGS. 7-8. FIG. 7 is an exploded view of transmission piston assembly 200 according to an example aspect. FIG. 8 is a section view of transmission piston assembly 200 shown installed in transmission housing 300. Piston assembly 200 includes backing plate 202, seal 204, release spring 206 and seal plate 208. Seal plate 208 is fixed to backing plate 202 and axially retains seal 204 and release spring 206 relative to the backing plate. In an example embodiment, seal plate 208 includes outwardly-extending radial wall 210 and circumferential wall 212 arranged to retain the seal.

In an example embodiment, seal plate 208 includes integrally-formed axially protruding portion 214 and integrally-formed inwardly-extending tab 216. Release spring 206 is arranged to pivot on protruding portion 214 and includes radially outwardly-extending finger portion 218 extending radially beyond seal plate tab 216. Otherwise stated, tabs 216 retain the spring at recesses 220. In an example embodiment, seal plate 208 is fixed to the backing plate by rivet 222, integral with and protruding from the backing plate. Piston assembly 200 further includes piston housing 224, seals 226 and 228, and seal plate 230. Seals 226 and 228 are retained between housing 224 and plate 230. Plate 230 is fixed to housing 224 by extruded rivets 232. Plate 230 includes axially protruding segments 234 for limiting axial travel of housing 224 towards to transmission housing 300. Snap ring 236 axially fixes the piston assembly in transmission housing 300.

The following description is made with reference to FIGS. 4-6. FIG. 4 is a section view of transmission piston assembly 100 taken generally along line 4-4 in FIG. 3 shown in a free state. FIG. 4A is a detail view of encircled region 4A in FIG. 4. FIG. 5 is a section view of transmission piston assembly 100 of FIG. 2 taken generally along line 4-4 in FIG. 3 shown installed in a transmission. FIG. 5A is a detail view of encircled region 5A in FIG. 5. FIG. 6 is a section view of transmission piston assembly 100 of FIG. 2 taken generally along line 4-4 in FIG. 3 shown in an axially displaced position. FIG. 6A is a detail view of encircled region 6A in FIG. 6.

Piston assembly 100 may be installed into a transmission in the following manner. Release spring 104 is pressed into housing 102 such that radially extending finger 120 is displaced radially inwardly with respect to axis 101 by circumferential wall 116 of the piston housing. Note that the radially displaced portion of the finger (i.e., tip 126) is shown in a free, non-displaced state and overlapped with the housing wall in FIG. 4A. Due to the configuration of spring 104, axially displacing radially extending finger 118 against piston housing 102 displaces finger 120 radially inwardly with respect to axis 101 away from the housing as shown in FIGS. 5 and 5A. Once the spring is displaced retainer 134 is installed onto a transmission shaft (not shown) to limit axial displacement of finger 118. In an example embodiment, retainer 134 is a snap ring. During operation of the transmission, hydraulic pressure displaces housing 102 farther away from housing 304 (i.e., in direction of arrow 136) to further displace radially extending fingers 118 and 120 and engage a clutch pack of the transmission as described above.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

I claim:

1. A piston assembly for a transmission comprising:
   a backing plate;
   a seal;
   a release spring; and,
   a seal plate fixed to the backing plate by a rivet integral with and protruding from the backing plate and axially retaining the seal and the release spring relative to the backing plate.

2. The piston assembly of claim 1 wherein the seal plate includes an outwardly-extending radial wall and a circumferential wall arranged to retain the seal.

3. The piston assembly of claim 1 wherein:
   the seal plate includes an integrally-formed axially protruding portion and an integrally-formed inwardly-extending tab; and,
   the release spring is arranged to pivot on the protruding portion and includes a radially outwardly-extending finger portion extending radially beyond the seal plate tab.

4. A piston assembly for a transmission comprising:
   a piston housing having a bore including:
      a first radial wall; and,
      a circumferential wall;
   a release spring including:
      a first radially outwardly extending finger portion for pressing engagement with the first radial wall;
      a second radially outwardly extending finger portion for pressing engagement with the circumferential wall; and,
      a conical portion disposed radially inward of the first and second finger portions; and,
   a seal plate, fixed to the piston housing and arranged to retain at least one piston seal.

5. The piston assembly of claim 4 wherein the piston housing includes a second radial wall for pressing against a clutch pack for the transmission.

6. The piston assembly of claim 4 wherein the release spring is arranged such that the second radially outwardly extending finger is radially displaced when the first radially outwardly extending finger is axially displaced.

7. The piston assembly of claim 4 further comprising first and second seals disposed axially between the piston housing and the seal plate.

8. The piston assembly of claim 4 wherein the seal plate is fixed to the piston housing by a rivet integral with and protruding from the piston housing.

* * * * *